United States Patent [19]  [11] 4,432,088
Frankel  [45] Feb. 14, 1984

[54] CARRIER SENSE DATA HIGHWAY SYSTEM

[75] Inventor: Robert Frankel, Centereach, N.Y.

[73] Assignee: The United States of America as represented by the United States Department of Energy, Washington, D.C.

[21] Appl. No.: 258,972

[22] Filed: Apr. 30, 1981

[51] Int. Cl.³ .............................................. H04J 6/00
[52] U.S. Cl. ...................................... 370/85; 370/86; 340/825.5
[58] Field of Search ...................... 370/86, 80, 85, 88; 340/825.05, 825.50, 825.73, 825.51; 371/57

[56] References Cited

U.S. PATENT DOCUMENTS

| | | | |
|---|---|---|---|
| 3,456,242 | 7/1969 | Lubkin et al. | 364/200 |
| 3,597,549 | 8/1971 | Farmer et al. | 370/88 |
| 3,732,543 | 5/1973 | Rocher et al. | 370/88 |
| 3,752,932 | 8/1973 | Frisone | 370/90 |
| 3,786,418 | 1/1974 | Nick | 370/86 |
| 3,796,992 | 3/1974 | Nakamura et al. | 370/85 |
| 3,863,220 | 1/1975 | Osawa et al. | 340/825.5 |
| 3,898,373 | 8/1975 | Walsh | 370/85 |
| 3,904,829 | 9/1975 | Martin et al. | 370/86 |
| 3,958,226 | 5/1976 | Kuroda et al. | 370/89 |
| 4,000,378 | 12/1976 | Caplan | 370/90 |
| 4,058,681 | 11/1977 | Imaizumi et al. | 370/85 |
| 4,063,220 | 12/1977 | Metcalfe et al. | 340/825.5 |
| 4,096,355 | 1/1978 | Rothauser et al. | 370/93 |
| 4,128,743 | 12/1978 | Huellwegen | 179/170 R |
| 4,210,780 | 7/1980 | Hopkins et al. | 370/85 |
| 4,281,380 | 7/1981 | DeMesa et al. | 370/85 |
| 4,282,512 | 8/1981 | Boggs et al. | 340/825.5 |
| 4,345,250 | 8/1982 | Jacobstahl | 370/85 |

OTHER PUBLICATIONS

*Mitre Technical Report MTR 3515,* "A Bus Communications System" 11, 1977, Hopkins.
*Communications of the ACM,* vol. 10, No. 7, "Ethernet: Distributed Packet Switching for Local Computer Networks", 7, 1976, Metcalfe et al.
*1981 Particle Accelerator Conference,* "Relway", BNL #28462, 3-11-81, Frankel et al.
"The Isabelle Control System", XI *International Conference on High Energy Accelerators,* Jul. 1980, Humphrey et al.
*IBM Technical Disclosure Bulletin,* vol. 22, No. 11, "Carrier Sense Subset Multiple Access System", Apr. 1980, West.

*Primary Examiner*—Gerald L. Brigance
*Attorney, Agent, or Firm*—Margaret C. Bogosian; Paul A. Gottlieb; Richard G. Besha

[57] ABSTRACT

A data transmission system includes a transmission medium which has a certain propagation delay time over its length. A number of data stations are successively coupled to the transmission medium for communicating with one another. Each of the data stations includes a transmitter for originating signals, each signal beginning with a carrier of a duration which is at least the propagation delay time of the transmission medium. Each data station also includes a receiver which receives other signals from other data stations and inhibits operation of the transmitter at the same data station when a carrier of another signal is received.

14 Claims, 3 Drawing Figures

CARRIER SENSE DATA HIGHWAY SYSTEM

BACKGROUND OF THE INVENTION

The U.S. Government has rights in this invention pursuant to Contract Number DE-AC02-76CH00016, between the U.S. Department of Energy and Associated Universities, Inc.

1. Field of the Invention

This invention relates to the transmission and receipt of data between a number of stations successively arranged along a transmission medium such as a coaxial cable.

2. Description of the Prior Art

The use of coaxial cable or similar transmission medium (e.g., fiber optic light pipes) for conveying various messages between a number of user stations arranged along the medium is becoming widespread. Among the first industries to bring the coaxial cable into the home of residential users are the community Antenna Television (CATV) Systems, wherein a master television antenna array is located to receive standard broadcast television signals from points relatively far away, and amplifiers connected with the array distribute the received signals over a number of cables into the homes of users who otherwise would not be able to receive the signals with their own antennas. Present day cable television networks provide not only standard television broadcasts through a cable into the user's home, but also provide locally generated closed circuit programming and other information services from private studios.

The above examples of cable communication are basically one-way systems in which each user has only passive capabilities, that is, one user cannot send information to any of the other user stations or to the master distributing station since the cable arrangement does not allow information to propagate away from each of the user stations. Recently, however, great gains in computer technology have made it possible to make a great deal of various information available at relatively low cost, so that it is not unusual for a private firm or corporation to purchase a computer which is tailored for its needs, and to make access to the computer available at a number of locations where potential users are usually found. Data stations having both passive, i.e. receiving capability, and active, transmitting capability are arranged at such locations and are each connected with the computer by a coaxial cable or like transmission medium. Each station thus can enter data into the computer, and thereafter receive the desired computational data. By connecting the cable in a closed loop arrangement with each of the data stations and the computer so that the stations and the computer are, in effect, wired "in series" with one another, it is then possible for each data station not only to transmit and receive data from the computer, but also to communicate with any desired one or a number of the other data stations in the loop. Examples of such loop-type communications systems appear in U.S. Pat. Nos. 3,752,932 issued Aug. 14, 1973, to J. B. Frisone; 3,597,549, issued Aug. 3, 1971, to Farmer, et al; 3,732,543, issued May 8, 1973, to Rocher, et al; and 3,904,829, issued Sept. 9, 1975, to Martin et al.

A problem arises when two or more users, each at different data stations, desire to transmit data along the cable simultaneously or sufficiently close together in time, so that the beginning of one data message from one station collides with another data message originating from a different station along the cable. After the messages collide, the resultant data propagating along the cable will be incorrect and no valid data message can be received at a station further along the cable in the direction of propagation.

The problem of data collision is not peculiar to a closed loop communications system, but is encountered with other arrangements such as an open end configuration as disclosed in U.S. Pat. No. 4,210,780, issued July 1, 1980, to Hopkins et al. This system includes an inbound unidirectional signal path, an outbound unidirectional signal path, and a unidirectional path coupler which joins the output of the inbound signal path to the input of the outbound signal path. Both of the inbound and outbound paths are coupled to a number of bus interface units each having associated subscriber devices distributed along the lengths of the inbound and outbound signal paths. Before any subscriber device transmits data into the inbound signal path, its bus interface unit senses for the presence of a data signal on the outbound signal path and, if no signal is detected, allows the data to be transmitted to be sent down the inbound signal path. This transmitted data then proceeds through the path coupler and propagates along the outbound signal path so that it can be sensed and received by any of the bus interface units of the entire system, including the bus interface unit of the transmitting station which then compares the data it receives from the outbound signal path with that transmitted by it down the inbound signal path. If this comparison is correct, no collision has occurred and the remainder of the data is transmitted. If the results of the comparison are negative, that is, if a collision has occurred and an invalid message has resulted, transmission is aborted and attempted once again after passage of a random time period.

Schemes for avoiding continued collisions of data in the closed series loop communications systems are known. For example, in the '932 Frisone patent, above, a message which originates from any one of a number of remote stations in the loop begins with a zero bit. Reception of this zero bit by any of the remote stations further down the loop in the direction of propagation operates to inhibit the receiving station from originating its own message, and causes the receiving station to allow the data from the originating station to pass unaltered. Transmission priority for the several remote stations therefore is determined in accordance with the location of each station along the loop. Further, in the '549 Farmer et al patent, above, priority among a number of data stations in a closed loop is determined by the first station on the loop to alter the last bit of an end-of-message code, which code is circulated about the loop, from a binary 1 to a zero. Subsequent stations thus are alerted that a station further up the loop desires to originate a message, and the subsequent stations then are inhibited from originating their own messages. However, none of the foregoing collision avoidance schemes operates to prevent the transmission of an invalid or incomplete message. Specifically, the bus interface unit of the '780 Hopkins et al patent operates to abort transmission by its associated subscriber device after a collision has been detected, rather than enable the subscriber device to complete a valid data transmission after it has gained access to the inbound signal path. Also, with the systems of the Frisone and Farmer et al patents, a data message originated by a station further down the loop transmission line in the direction of propagation is always subject to having its data message interrupted by a station closer to the beginning of the line, so that a priority according to position along the loop is established. In other words, only the first station along the loop can originate and complete a valid data message once it has gained across the loop, with any degree of certainty.

SUMMARY OF THE INVENTION

The present invention overcomes the above shortcomings in the prior art by providing a data transmission system including a transmission medium for propagating information along a desired path, the transmission medium having a certain propagation delay time over its entire length, and a number of data stations successively coupled to the transmission medium for communicating with one another. Each of the data stations includes transmitting means for originating signals wherein each signal begins with a carrier of a duration at least equal to the propagation delay time of the transmission medium, and receiving means for receiving other signals which originate from other data stations and for inhibiting the transmitting means at the same data station from originating a signal in response to reception of any of the other signals.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there are illustrated and described preferred embodiments of the invention.

DETAILED DESCRIPTION OF THE INVENTION

Figure 1:
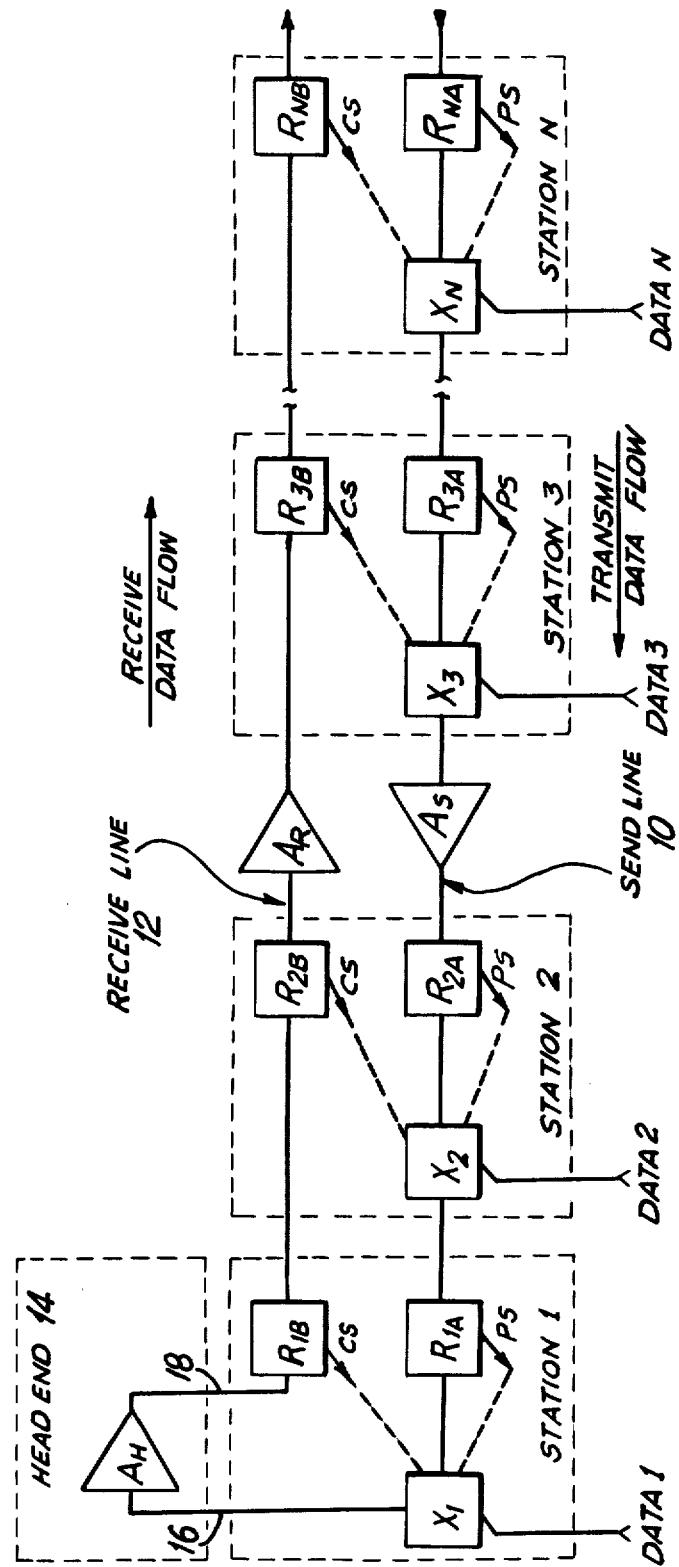
FIG. 1 is a block diagram of one embodiment of a carrier sense data highway system according to the invention.

In FIG. 1, a carrier sense data highway system according to the invention includes a send line 10, a receive line 12 and a head end 14 which serves to couple the output 16 of send line 10 to the input 18 of the receive line 12. Send line 10 and receive line 12 each can be conventional coaxial cable, or equivalent transmission medium which is capable of propagating information including data signals in a given direction. The head end 14 includes a conventional head end amplifier $A_H$ or equivalent coupling device. A number of data stations, Station 1, Station 2, Station 3 . . . Station N are coupled successively along the send line 10 and the receive line 12, and each station is arranged to originate a signal which propagates along the send line 10 in the direction toward the head end 14. The message thereafter is coupled by head end 14 to the receive line 12 where it can be sensed and received by each of the data stations along the entire length of the send line 10 and receive line 12. Additional data stations (not shown) can be added, successively, by extending send line 10 and receive line 12 to each additional station from the right side of Station N as viewed in FIG. 1.

One or more send line amplifiers $A_S$ and one or more receive line amplifiers $A_R$ can be located along the send and receive lines 10,12 as may be required to maintain sufficient signal strength, as is well known in the art.

In the following discussion, it will be assumed that the send line 10 and the receive line 12 are conventional coaxial transmission lines of the same length. It will also be assumed that the system operates with a radio frequency (RF) carrier signal which is modulated in accordance with the data information to be exchanged along the data stations, and that the send line 10 and the receive line 12 each exhibit a propagation delay time $\tau$ over their entire lengths. The propagation delay time through the head end 14 will be considered to be negligible. Of course, the present invention is not limited by these assumptions, and may be embodied as well in systems using other transmission media as long as the propagation delay times along various parts of the chosen transmission medium are known.

Any given data station includes a data transmitter $X_n$ where n=1 to N, which transmitter is coupled to the send line 10 by a conventional CATV directional coupler so that the RF signals originating from any of the transmitters $X_n$ each propagate in the direction toward the head end 14. Each data station also includes a dual receiving system $R_{nA}$, $R_{nB}$, where n=1 to N. One receiver portion $R_{nA}$ is also coupled to the send line 10 through a conventional CATV directional coupler and operates to establish a priority of data among the various data stations in accordance with their relative positions along the send line 10. Specifically, in the event the receiver portion $R_{nA}$ detects an RF carrier signal which originates from a transmitter $X_m$, where m>n, the receiver $R_{nA}$ provides a priority sense signal PS to its associated transmitter $X_n$. Sense signal PS serves to inhibit transmitter $X_n$ from continuing with any signal transmission which may have commenced prior to detection of the carrier by receiver portion $R_{nA}$.

Each receiver portion $R_{nB}$ of the receiving system at a given data station is coupled to the receive line 12 also by way of a conventional CATV directional coupler. Receiver portion $R_{nB}$ operates to receive and demodulate or decode all RF signals which propagate along the receive line 12 away from the head end 14, and to allow display devices (not shown) or other processing means located at the data station to respond to data information contained in the signals. Further, each receiver portion $R_{nB}$ provides a carrier sense signal CS to its associated transmitter $X_n$ in the event any signals are present on the receive line 12. Signal CS operates to prevent the transmitter $X_n$ at a given data station n from commencing to transmit a signal which includes data (DATA n) supplied to the transmitter $X_n$ at the data station n.

Operation of the data highway system of FIG. 1 will now be described.

Assuming, for example, that at data station 2, neither sense signal PS nor CS is produced by the receiver portions $R_{2A}$, $R_{2B}$ to inhibit the transmitter $X_2$ from transmitting, transmitter $X_2$ begins transmitting an unmodulated RF carrier signal for a time period of at least $2\tau$ where, as noted above, $\tau$ is the propagation delay time of either the entire send line 10, or the entire receive line 12. After the time period $2\tau$ has elapsed, data station 2 then transmits a data message or packet which is preceded by a station address code in accordance with conventional data transmission formats.

Receiver portion $R_{nB}$ at each of the data stations will then detect the presence of the carrier or the data message originating from data station 2 by way of its directional coupling onto the receive line 12, and will inhibit its associated transmitter $X_n$ from commencing its own data transmission except, of course, for transmitter $X_2$ which began transmitting before receiver portion $R_{2B}$ detected any carrier or data message on the receive line 12.

Thus far, the only possible way for two data messages or packets, each originating from a different data station, to collide is if they originate at times which are within the time period $\tau$ of one another, so that neither one of the originating stations has yet received the other station's transmission. This possibility of a data collision is forestalled by receiver portions $R_{nA}$ which establish a priority of transmission in accordance with the relative positions of the data stations along the send line 10.

As an example, if receiver portion $R_{2B}$ of data station 2 detects that the receive line 12 is free, and transmitter $X_2$ at the same data station has been provided with data (DATA 2) for transmission, transmitter $X_2$ will first transmit an unmodulated RF carrier for a time period of $2\tau$, this carrier being coupled into the send line 10 to propagate in the direction toward the head end 14. Assuming next that data station 3 begins to originate data from its transmitter $X_3$ at the same time that the transmitter $X_2$ began transmitting, the signal from transmitter $X_3$ will reach receiver portion $R_{2A}$ of data station 2 before the time period $2\tau$ has elapsed, since the propagation delay time of the entire send line 10 is only $\tau$. Receiver portion $R_{2A}$ will then produce a priority sense signal PS which serves to inhibit the transmitter $X_2$ from continuing to originate its own carrier, and the transmission from transmitter $X_3$ will continue to propagate down the send line 10 through data station 2 (including transmitter $X_2$) in the direction toward head end 14. The transmission from data station 3 then passes through head end amplifier $A_H$ and on through all the receiver portions $R_{nB}$ at each of the data stations by way of the receive line 12. Since the signal originating from data station 3 includes an address or destination code, those data stations which are among those designated in this code to receive the data within the signal will then decode the signal, and display or otherwise process the data obtained. Importantly, since no collision of data messages within the transmitted signals can ever occur with the system of FIG. 1, the data messages received and decoded at any of the data stations are always valid and complete.

In sum, the system of FIG. 1 provides a number of distinct advantages over existing data networks, among which are the following:

1. The system acts as a master/master democracy until a carrier collision (as opposed to a collision of data messages) occurs.

2. Even if a carrier collision occurs, a valid message will always be transmitted and received without incurring a random waiting period.

3. Only a time period $2\tau$ must elapse before a data station can begin sending its data message or packet (headed by any desired destination code).

4. Conventional, CATV directional couplers allow most of the cable connections to be of a passive nature and, thus, more reliable.

5. Transmission media other than coaxial cable, e.g. fiberoptics, can be employed and will allow the system to operate in the same manner.

6. Conventional frequency shifting schemes or multiplexing may be employed at each of the data stations and the head end 14 so that a one-cable system is possible.

7. Frequency shifting schemes may be employed to provide transmission priority among the data stations which is not dependent on the position of any one station relative to the other stations along the send line 10.

8. The system can use conventional, low cost CATV components which greatly simplify the electronic circuit implementation of the system arrangement.

Figure 2:
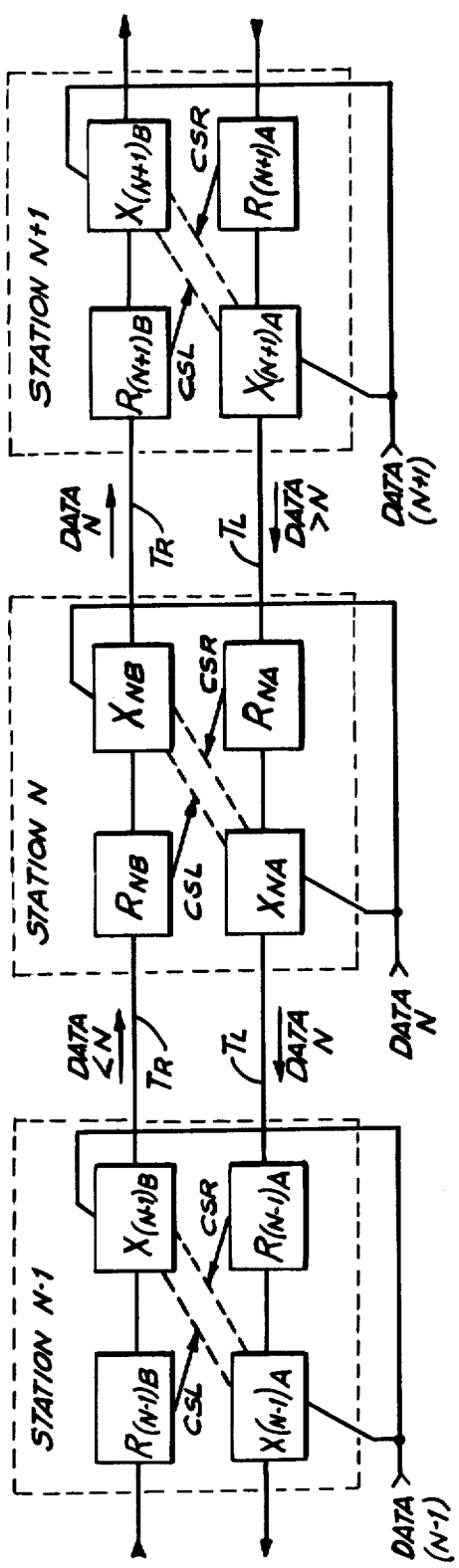
FIG. 2 is a block diagram of a second embodiment of a carrier sense data highway system according to the invention.

FIG. 2 shows a second embodiment of a carrier sense data highway system according to the present invention, including random priority.

Basically, the system of FIG. 2 includes a number of data stations ... Station N−1, Station N, Station N+1 ... each of which are coupled to two data highway lines or cables $T_L$ and $T_R$. Cables $I_L$ and $T_R$ may each be a conventional coaxial cable or other transmission medium.

Each data station has a transmitter-receiver pair or a transceiver allocated to each of the cables $T_L$, $T_R$, and information originating from each of the data stations propagates only in the direction toward the left along cable $T_L$, and in the direction toward the right along cable $T_R$, as viewed in FIG. 2.

For example, at data Station N, transmitter $X_{NA}$ and receiver $R_{NA}$ are each coupled through a conventional directional coupler (not shown) to the cable $T_L$ so that, when DATA N is supplied to the transmitter $X_{NA}$, it will transmit a signal containing DATA N along cable $T_L$ toward Station N−1 and all data stations beyond.

Further, data Station N includes another transmitter $X_{NB}$ and an associated receiver $R_{NB}$ both of which are directionally coupled to cable $T_R$ so that a signal transmitted by transmitter $X_{NB}$ propagates along cable $T_R$ only in the direction toward data Station N+1, and all data stations beyond Station N+1 which are coupled to cable $T_R$. The receiver $R_{NB}$ responds only to signals propagating along the cable $T_R$ from data stations toward the left of Station N, as viewed in FIG. 2.

At data Station N, receiver $R_{NA}$ provides a carrier sense signal CSR which serves to inhibit both of the transmitters $X_{NA}$, $X_{NB}$ from originating a signal from data Station N, in the event a signal which is propagating along the cable $T_L$ and which originates from a data station to the right of Station N is sensed by the receiver RNA. Likewise, receiver $R_{NB}$ provides a carrier sense signal CSL which inhibits both of the transmitters $X_{NA}$, $X_{NB}$ from originating a signal from data Station N in the event a signal which is propagating along the cable $T_R$ and originates from a data station to the left of Station N is sensed by the receiver $R_{NB}$.

For purposes of the following discussion, it will be assumed that a finite number of data stations are successively coupled to the cables $T_R$, $T_L$ as shown in FIG. 2, and that the greatest propagation delay time between two data stations along either one of the cables $T_R$, $T_L$ is $\tau$.

Preferably, each complete signal begins with a carrier of a time period of at least $\tau$, followed by a data message or packet which corresponds to the data (DATA N) supplied to the transmitters $X_{NA}$, $X_{NB}$.

By transmitting toward the right on cable $T_R$, and toward the left on cable $T_L$, only the propagation delay time $\tau$ of either cable, rather than $2\tau$, need be considered for purposes of collision detection. Also, by virtue of the directional characteristic of the coupling of the data station transmitters and receivers to the cables $T_R$, $T_L$, a particular data station will not receive its own transmission. Accordingly, any signal, e.g., an RF carrier, received at a particular data station while that station is transmitting indicates a collision.

An example of the operation of the system of FIG. 2 now follows:

DATA N is supplied to the transmitters $X_{NA}$, $X_{NB}$ of data Station N for transmission to all of the other data stations coupled to the cables $T_R$, $T_L$. The receivers $R_{NB}$, $R_{NA}$ of data Station N first sense the cables to determine whether or not any of the other data stations are transmitting. That is, receiver $R_{NB}$ senses cable $T_R$ for transmissions originating from stations toward the left of data Station N, and receiver $R_{NA}$ senses the cable $T_L$ for transmissions originating from data stations toward the right of Station N, as viewed in FIG. 2. If either receiver senses a signal on its associated cable, then the transmitters $X_{NA}$, $X_{NB}$ of Station N are inhibited by either of the signals CSL or CSR from originating a signal containing DATA N. If neither carrier sense signal is produced, then data Station N transmits its signal to the data stations toward its left by transmitter $X_{NA}$, and to the remaining data stations toward the right of Station N by transmitter $X_{NB}$. As mentioned above, data Station N will not receive the signal it originates owing to the directional coupling arrangement employed. A complete initial transmission of a carrier of time period $\tau$, prior to transmission of a data message or packet corresponding to DATA N, will ensure that data Station N can continue to originate its message without collision.

Because the propagation delay time which must be considered for purposes of collision detection is only that of either of the cables $T_R$, $T_L$, and not the sum of the propagation delay times for each cable, the system of FIG. 2 can be used advantageously for process control and computer communication over distances greater than 1000 feet and up to about 15,000 feet, assuming the use of conventional coaxial cable. In addition to offering relatively short delay times for long cable runs, the system of FIG. 2 provides simple collision detection, and allows for random priority among the data stations coupled to the cables $T_R$, $T_L$. Of course, the system of FIG. 2 can also be configured to provide priority by position, if desired.

Figure 3:
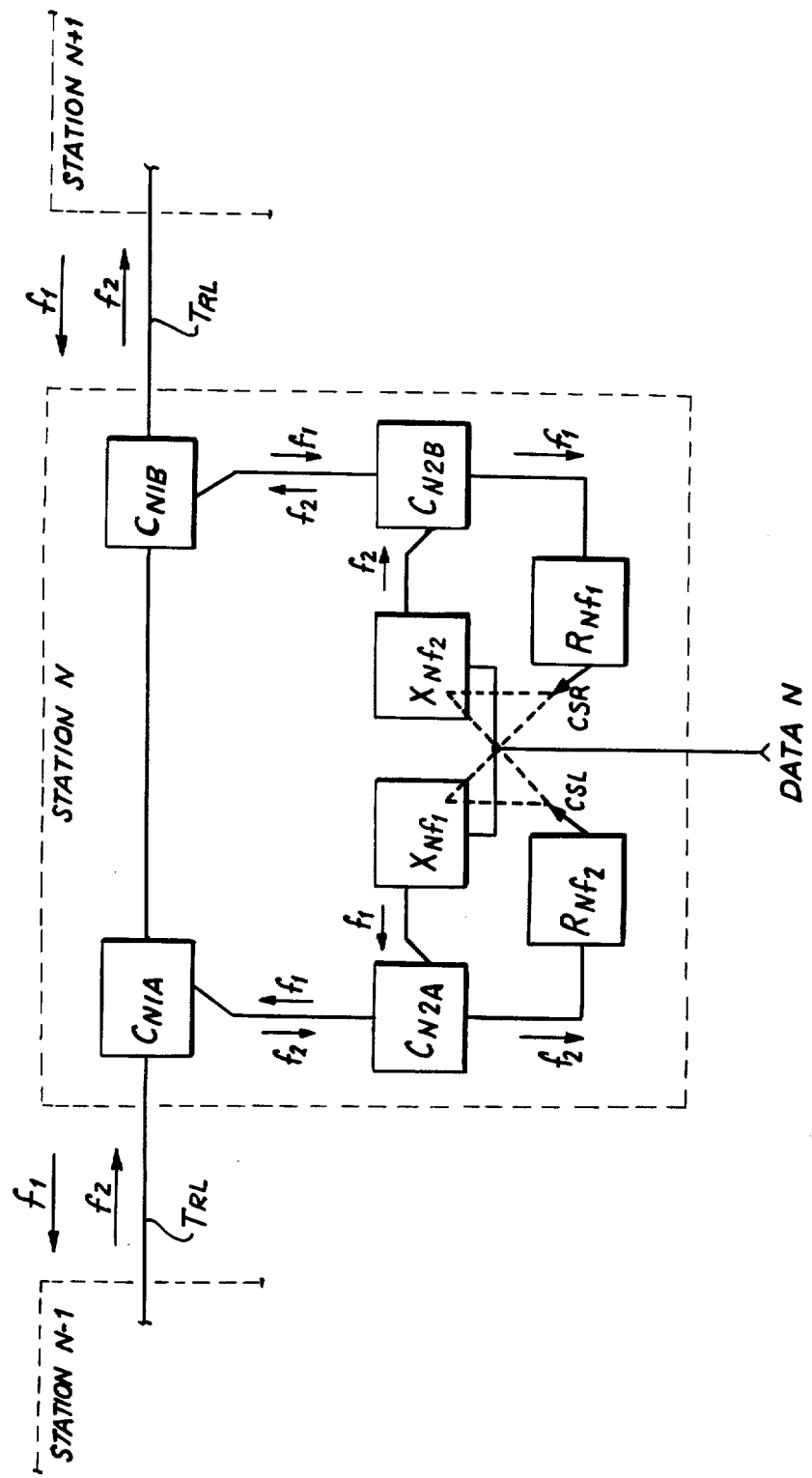
FIG. 3 is a block diagram of a third embodiment of a carrier sense data highway system according to the invention.

FIG. 3 shows a third embodiment of a carrier sense data highway system according to the present invention, with which it is possible to provide random priority or other contention schemes to overcome collisions of data.

The system of FIG. 3 also includes a number of data stations ... Station $N-1$, Station N, Station $N+1$ ... each coupled to a single line or cable $T_{RL}$. Cable $T_{RL}$ may be a conventional coaxial cable or other transmission medium.

Each data station comprises two transmitter-receiver pairs and a number of couplers arranged so that information originating from each station propagates in the direction toward the left along cable $T_{RL}$ at a frequency $f_1$, and in the direction toward the right along cable $T_{RL}$ at a frequency $f_2$, relative to the originating station.

For example, at data Station N, a pair of directional couplers $C_{N1A}$ and $C_{N1B}$ are inserted serially along the cable $T_{RL}$ so that the output ports O of the two couplers are connected to one another. Accordingly, signals propagating in the direction from the input to the output port of the coupler $C_{N1A}$, at frequency $f_2$, will be sampled out of the coupler tap, as shown. Also, signals entering the coupler tap at frequency $f_1$ will be coupled into the cable $T_{RL}$ and propagate out from the input port of the coupler $C_{N1A}$ in accordance with well-known characteristics of directional couplers. Of course, other signals at frequency $f_1$ entering the output port O of the coupler $C_{N1A}$ will travel substantially unattenuated through the coupler and out of the input port to Station $N-1$ and all stations beyond. Also, signals entering the tap of coupler $C_{N1B}$ at frequency $f_2$ are coupled to the cable $T_{RL}$ to travel in the direction out from the input port of coupler $C_{N1B}$, and signals at frequency $f_2$ entering the output port of coupler $C_{N1B}$ will propagate out from the input port of that coupler toward Station $N+1$ and all stations beyond.

Station N also includes directional couplers $C_{N2A}$ and $C_{N2B}$ each with their input ports connected to corresponding taps of the couplers $C_{N1A}$ and $C_{N1B}$, as shown. A transmitter $X_{N f1}$ which provides signals at frequency $f_1$ is coupled to the directional tap of coupler $C_{N2A}$ so that the signal from transmitter $X_{N f1}$ propagates out from the input port of coupler $C_{N2A}$ to be coupled into the cable $T_{RL}$ by way of coupler $C_{N1A}$. Another transmitter $X_{N f2}$, which provides signals at frequency $f_2$, is connected to the directional tap of coupler $C_{N2B}$ so that the signals from transmitter $X_{N f2}$ propagate out from the input port of coupler $C_{N2B}$ to be coupled into the cable $T_{RL}$ by the coupler $C_{N1B}$.

Data which is to originate from Station N, DATA N, is supplied to both of the transmitters $X_{N f1}$, $X_{N f2}$ so that, assuming the transmitters $X_{N f1}$, $X_{N f2}$ are not inhibited, a signal at frequency $f_1$ will originate from Station N out from the input port of coupler $C_{N1A}$, and a signal at frequency $f_2$ will propagate out from input port of coupler $C_{N1B}$, both of these signals containing DATA N.

A receiver $R_{N f2}$, which is adequately filtered to respond substantially only to signals at frequency $f_2$, is connected to the output port of coupler $C_{N2A}$ to receive data contained in signals at frequency $f_2$ which are sampled from the cable $T_{RL}$ by coupler $C_{N1A}$ and pass through coupler $C_{N2A}$. Such signals will originate only from Station $N-1$ or other stations further to the left of Station N, as viewed in FIG. 3, since signals at frequency $f_2$ originating from Station N or any other station toward the right of Station N will not appear at the directional tap of coupler $C_{N1A}$, according to well-known characteristics of directional couplers. Receiver $R_{N f2}$ responds by providing a carrier sense signal CSL which operates to inhibit the station transmitters $X_{N f1}$, $X_{N f2}$ from originating a signal containing DATA N from Station N at either frequency $f_1$, $f_2$.

Another receiver $R_{N f1}$, which is adequately filtered to respond substantially only to data signals at the carrier frequency $f_1$ is connected to the output port of coupler $C_{N2B}$ so that signals originating from stations to the right of Station N at frequency $f_1$ will be provided to receiver $R_{N f1}$ through coupler $C_{N2B}$ after these signals are sampled from $T_{RL}$ by coupler $C_{N1B}$. It will be understood that signals originating from Station N at frequency $f_1$ or from any other stations to the left of Station N at frequency $f_1$ will not appear at the directional tap of coupler $C_{N1B}$ for detection by receiver $R_{N f1}$. Receiver $R_{N f1}$ thus provides a carrier sense signal CSR which also operates to inhibit the station transmitters $X_{N f1}$, $X_{N f2}$ from originating signals containing DATA N from Station N, inasmuch as the presence of a signal at frequency $f_1$ at the output port of coupler $C_{N2B}$ indicates that another station to the right of Station N is originating the signal.

The embodiment of FIG. 3 has the advantage that only a single cable $T_{RL}$ is required to extend between all of the data stations, rather than the two cables $T_R$, $T_L$ in the embodiment of FIG. 2, while still reducing the amount of time it takes to transmit a signal to all stations as compared to the embodiment of FIG. 1. However, some limitations on the frequency spectrum which can be used for propagating signals from the various stations is imposed, since the station receivers must discriminate between signals at the frequencies $f_1$ and $f_2$. Otherwise, the basic operation of the system of FIG. 3 is similar to that of the system of FIG. 2.

While specific embodiments of the invention have been shown and described in detail to illustrate the application of the inventive principles, it will be understood that the invention may be embodied otherwise without departing from such principles.

What is claimed is:

1. A data transmission system comprising a transmission medium of a predetermined overall length for propagating information along a desired path, said transmission medium having a certain propagation delay time corresponding to said overall length; and a number of data stations successively coupled to said transmission medium over its length for communicating with one another, any given one of said data stations including:
   (a) transmitting means for transmitting signals into said transmission medium wherein each of said signals begins with a carrier of a duration of at least said certain propagation delay time and said carrier is followed by a data message which corresponds to data information;
   (b) means for supplying data information to said transmitting means to enable a signal including said carrier and said data message to originate from said given data station; and
   (c) receiving means coupled to said transmitting means for receiving other signals which originate from other ones of said data stations located in a given direction along said transmission medium relative to said given data station and for inhibiting said transmitting means from originating a signal from said given data station in response to reception of a carrier of any of said other signals, said receiving means being arranged to provide said other signals to said transmitting means for transmission to remaining ones of said data stations located in the opposite direction along said transmission medium relative to said given data station, so that said given data station can originate and complete a data message which can be validly received by other selected ones of said data stations after said carrier originates continuously over said certain propogation delay time from said given data station.

2. A data transmission system according to claim 1, wherein said transmission medium comprises a send line and a receive line, and including a head end for coupling one end of said send line to one end of said receive line, said transmitting means being coupled to said send line to transmit said signals in the direction toward said head end, said receiving means including a first receiver portion coupled to said receive line for providing a first sense signal to inhibit said transmitting means from commencing to originate a signal from said given data station in response to a signal originating from another one of said data stations, and a second receiver portion coupled to said send line for providing a second sense signal to inhibit said transmitting means from continuing to originate a signal from said given data station in response to a carrier originating from another one of said data stations along said send line in the direction away from said head end relative to said given data station.

3. A data transmission system according to claim 2, wherein said send line and said receive line each comprise a coaxial cable.

4. A data transmission system according to claim 2, wherein said transmitting means and said receiving means each comprise a directional coupler.

5. A data transmission system according to claim 1, wherein said transmission medium comprises a first cable and a second cable extending generally parallel to one another, said transmitting means comprises a first transmitter coupled to said first cable to transmit said signals in one direction along said first cable relative to said given data station and a second transmitter coupled to said second cable to transmit said signals in the other direction along said second cable relative to said given data station, and said receiving means comprises a first receiver coupled to said first cable for responding to signals originating from other data stations located in said other direction along said first cable relative to said given data station and a second receiver coupled to said second cable for responding to signals originating from other data stations located in said one direction along said second cable relative to said given data station.

6. A data transmission system according to claim 5, wherein said first receiver provides a first sense signal to inhibit both said first and said second transmitters from originating a signal from said given data station in response to a carrier originating from another one of said data stations located in said other direction along said first cable relative to said given data station, and said second receiver provides a second sense signal to inhibit both said first and said second transmitters from originating a signal from said given data station in response to a carrier originating from another one of said data stations located in said one direction along said second cable relative to said given data station.

7. A data transmission system comprising a transmission medium for propagating information along a desired path, said transmission medium including first and second cables of equal length extending generally parallel to one another and including a transmission delay in each cable corresponding to its respective length; and a number of data stations successively coupled to said transmission medium over the lengths of said first and said second cables for communicating with one another, any given one of said data stations comprising:
   (a) transmitting means including a first transmitter coupled to said first cable to transmit signals containing data messages in a given direction along said first cable relative to said given data station and a second transmitter coupled to said second cable to transmit said signals in the other direction along said second cable relative to said given data station;
   (b) means for supplying data information to said first and said second transmitters to enable said signals to originate from said given data station wherein each of said signsl begins with a carrier of a duration of at least said transmission delay and said carrier is followed by a data message which corresponds to said information wherein said data messages correspond to the supplied data information; and (c) receiving means coupled to said transmitting means for receiving other signals which originate from other ones of said data stations located in said given direction along said transmission medium relative to said given data station and for inhibiting said transmitting means from originating either signals from said given data station in response to reception of said other signals, said receiving means being arranged to provide said other signals to said transmitting means for transmission to remaining ones of said data stations located in the opposite direction from the direction from which said other signals are received.

8. A data transmission system according to claim 7, wherein said receiving means comprises a first receiver coupled to said first cable for responding to signals originating from other data stations located in said given direction along said first cable relative to said given data station, and a second receiver coupled to said second cable for responding to signals originating from other data stations located in said other direction along said second cable relative to said given data station.

9. A data transmission system according to claim 8, wherein said first receiver provides a first sense signal to inhibit both said first and said second transmitters from originating a signal from said given data station in response to a signal originating from another one of said data stations located in said other direction along said first cable relative to said given data station, and said second receiver provides a second sense signal to inhibit both said first and said second transmitters from originating a signal from said given data station in response to a signal originating from another one of said data stations located in said given direction along said second cable relative to said given data station.

10. A data transmission system according to claim 1, wherein said transmission medium comprises a single cable, said transmitting means comprises a first transmitter coupled to said cable to transmit signals in one direction along said cable relative to said given data station at one frequency and a second transmitter coupled to said cable to transmit said signals in the other direction along said cable relative to said given data station at another frequency, and said receiving means comprises a first receiver coupled to said cable for responding to signals originating from other data stations located in said other direction along said cable relative to said given data station and a second receiver coupled to said cable for responding to signals originating from other data stations located in said one direction along said cable relative to said given data station.

11. A data transmission system according to claim 10, wherein said first receiver provides a first sense signal to inhibit both said first and said second transmitters from originating a signal from said given data station in response to a carrier originating from another one of said data stations located in said other direction along said cable relative to said given data station, and said second receiver provides a second sense signal to inhibit both said first and said second transmitters from originating a signal from said given data station in response to a carrier originating from another one of said data stations located in said one direction along said cable relative to said given data station.

12. A data transmission system comprising a transmission medium for propagating information along a desired path, said transmission medium including a single cable and including a transmission delay corresponding to its length; and a number of data stations successively coupled to said cable for communicating with one another, any given one of said data stations comprising:

(a) transmitting means including a first transmitter coupled to said cable to transmit signals containing data messages in a given direction along said cable relative to said given data station at one frequency and a second transmitter coupled to said cable to transmit said signals in the other direction along said cable relative to said given data station at another frequency wherein said signal in each direction begins with a carrier signal of a duration of at least said transmission delay and said carrier signal is followed by a data message which corresponds to said information;

(b) means for supplying data information to said first and second transmitters to enable said signals to originate from said given data station wherein said data messages correspond to the supplied data information; and (c) receiving means coupled to said transmitting means for receiving other signals which originate from other ones of said data stations located in either direction along said cable relative to said given data station and for inhibiting said transmitting means from originating said signals from said given data station in response to reception of said other signals, said receiving means being arranged to provide said other signals to said transmitting means for transmission to remaining ones of said data stations located in the opposite direction from the direction from which said signals were received.

13. A data transmission system according to claim 12, wherein said receiving means comprises a first receiver coupled to said cable for responding to signals originating from other data stations located in said given direction along said cable relative to said given data station, and a second receiver coupled to said cable for responding to signals originating from other data stations located in said other direction along said cable relative to said given data station.

14. A data transmission system according to claim 13, wherein said first receiver provides a first sense signal to inhibit both said first and said second transmitters from originating a signal from said given data station in response to a signal originating from another one of said data stations located in said given direction along said cable relative to said given data station, and sid second receiver provides a second sense signal to inhibit both said first and said second transmitters from originating a signal from said given data station in response to a signal originating from another one of said data stations located in said other direction along said cable relative to said given data station.

* * * * *